No. 826,090. PATENTED JULY 17, 1906.
J. DORAN.
ELECTRIC SIGNALING AND TESTING SYSTEM.
APPLICATION FILED MAR. 23, 1906.
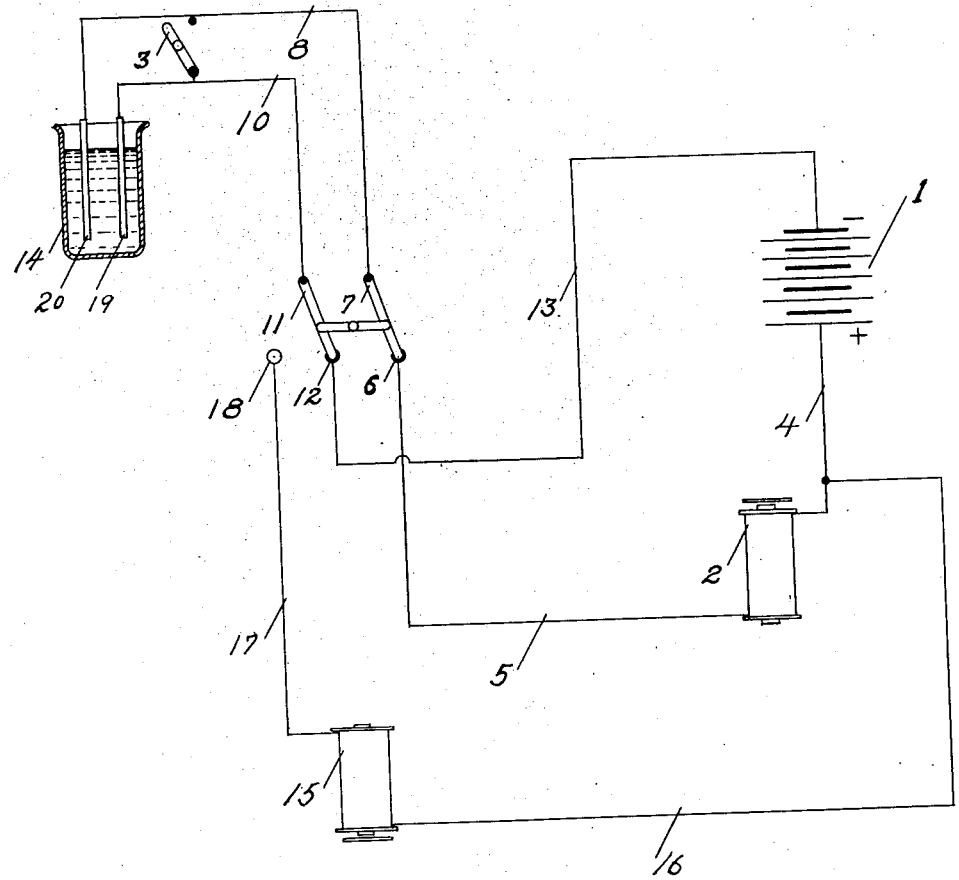
WITNESSES
J. L. Fuller.
J. Donsbach.
INVENTOR
John Doran,
By Mosher & Curtis
Attys.

UNITED STATES PATENT OFFICE.

JOHN DORAN, OF SCHENECTADY, NEW YORK.

ELECTRIC SIGNALING AND TESTING SYSTEM.

No. 826,090.   Specification of Letters Patent.   Patented July 17, 1906.

Application filed March 23, 1906. Serial No. 307,560.

*To all whom it may concern:*

Be it known that I, JOHN DORAN, a citizen of the United States, residing at Schenectady, county of Schenectady, and State of New York, have invented certain new and useful Improvements in Electric Signaling and Testing Systems, of which the following is a specification.

The invention relates to such improvements; and it consists of the novel construction and combination of parts hereinafter described and subsequently claimed.

Reference may be had to the accompanying drawing and the reference characters marked thereon, which form a part of this specification.

Similar characters refer to similar parts.

The single figure of the drawing is a diagrammatic representation of an electric signaling and testing system embodying my invention.

In the use of electric signaling systems—such, for example, as a fire-alarm telegraph system—what is known as a "closed-circuit" system is ordinarily preferred to an open-circuit system for the reason that in a system wherein the circuit is normally closed an accidental breaking of the circuit can be at once detected, as such a break will cause the operation of the signal indicator or alarm in the same manner that a break in the circuit by the intentional operation of the signal key or switch will cause said indicator to be operated, whereas in the use of an open-circuit system the detection of an accidental break in the circuit is difficult, so that frequent examination or testing of the circuit is necessary to insure the proper operation of the apparatus when it is desired to use the same for signaling purposes.

My invention relates to an open-circuit signaling system; and the principal object of the invention is to facilitate the testing of the circuit in such a system.

Referring to the drawing, wherein the invention is shown in its preferred form, 1 represents a source of electrical energy, as an ordinary battery, and 2 an electromagnetic signal-indicator normally in circuit with said battery when the signal-switch 3 is closed, said circuit being formed in part by a conductor 4, connecting one end of the coil of the electromagnetic apparatus 2 with one pole of the battery; a wire 5, connecting the other end of said coil with the terminal 6 of a pole-changing switch the lever 7 of which is normally in contact with said terminal 6; the wire 8, connecting said pole-changing-switch lever 7 with one terminal of the signal-switch 3; the wire 10, connecting the other terminal of the signal-switch 3 with the other lever 11 of the pole-changing switch which is normally in contact with the terminal 12, and the wire 13, connecting said terminal 12 with the other pole of the battery, the circuit thus formed being adapted to be operated by means of the signal-switch 3 in the usual manner of operating open-circuit electrical signaling systems.

Adjacent to the signal-switch 3 I connect in circuit with the battery 1 an electrolytic cell 14, resistant to the passage of an electric current in one direction and non-resistant to the passage of an electric current in the opposite direction, the circuit-wires 8 and 10 being connected with the respective electrodes of said cell in such a manner that the cell is resistant to the passage of the electric current through the circuit in the normal condition of the apparatus.

I do not wish to be limited to any specific construction of cell having the stated characteristics, as any rectifying-cell may be employed. A suitable cell for this purpose comprises electrodes respectively of aluminium and carbon in a suitable electrolyte, which cell offers but slight resistance to an electric current entering at the carbon and leaving at the aluminium, but which offers a very marked resistance, so as practically to interrupt the flow of the current when the current is reversed, so as to enter at the aluminium.

The cell 14 is so located and connected with the other parts of the apparatus that the signal-switch 3 is adapted to connect together the wires or conductors on opposite sides of said cell.

An electromagnetic test-indicator 15 has one end of its coil connected by a wire 16 with the wire 4, leading to one pole of the battery, while the other end of its coil is connected by wire 17 with the third terminal 18 of the pole-changing switch.

It will be seen that in the normal condition of the apparatus, as shown in the drawing, the signal-switch 3 being open and the cell 14 being resistant to the current in the circuit, of which it forms a part, no current flows through said circuit; but when the signal-switch 3 is closed the current will flow through said circuit except the cell 14, causing the electromagnetic signal-indicator 2 to be operated. When it is desired to test the condition of the circuit, the signal-switch 3 being open, the pole-changing switch is reversed to cause the lever 11 to contact with the terminal 18 and the lever 7 with the terminal 12, whereby the electromagnetic signal-indicator 2 is cut out of the circuit and the electromagnetic test-indicator 15 is cut into the circuit, said circuit extending from the source of electrical energy through the wires 4 and 16, the coil of the test-indicator 15, the wire 17, the pole-changing-switch lever 11, and wire 10 to the carbon electrode 19, and from the aluminium electrode 20 through the wire 8, pole-changing lever 7, and wire 13 to the source of electrical energy. Under the conditions last named if the circuit is in proper condition the fact will be indicated by the operation of the test-indicator 15; but if said test-indicator fails to operate under such conditions then it will be known that a break has occurred in the circuit and steps can be taken to repair the same.

I do not wish to be limited to any specific kind of signal-indicator for use in my apparatus, as any electrically-operated indicator may be employed and any known form of signal-switch may be employed.

What I claim as new, and desire to secure by Letters Patent, is—

1. In an electric signaling and testing system, a source of electrical energy, an electrolytic cell resistant to the passage of an electric current in one direction, and non-resistant to the passage of an electric current in the opposite direction, conductors normally connecting said cell and source of electrical energy in circuit with said cell resistant to the passage of the electric current therethrough; a normally open signal-switch adapted to connect together said conductors on opposite sides of said cell; and means whereby a testing electric current may be passed in the opposite direction through said circuit.

2. In an electric signaling and testing system a source of electrical energy, an electrolytic cell resistant to the passage of an electric current in one direction and non-resistant to the passage of an electric current in the opposite direction; conductors normally connecting said cell and source of electrical energy in circuit with said cell resistant to the passage of the electric current therethrough, a normally open signal-switch adapted to connect together said conductors on opposite sides of said cell; and a pole-changing switch in said circuit.

3. In an electric signaling and testing system, a source of electrical energy, an electrolytic cell resistant to the passage of an electric current in one direction, and non-resistant to the passage of an electric current in the opposite direction, conductors normally connecting said cell and source of electrical energy in circuit with said cell resistant to the passage of the electric current therethrough; a normally open signal-switch adapted to connect together said conductors on opposite sides of said cell; an electrically-actuated signal-indicator normally in said circuit, an electrically-actuated test-indicator normally out of said circuit; and pole-changing switch mechanism whereby said signal-indicator can be cut out of, and said test-indicator cut into, said circuit, and whereby a testing-current may be passed in the opposite direction through said circuit.

In testimony whereof I have hereunto set my hand this 19th day of March, 1906.

JOHN DORAN.

Witnesses:
J. DONSBACH,
FRANK C. CURTIS.